May 17, 1966 R. KERSTEN 3,252,002

IMPULSE-FORMING NETWORK

Filed Aug. 7, 1962

United States Patent Office 3,252,002
Patented May 17, 1966

3,252,002
IMPULSE-FORMING NETWORK

Rudolf Kersten, Munich, Germany, assignor to Siemens & Halske Aktiengesellschaft, Berlin and Munich, Germany, a German corporation Filed Aug. 7, 1962, Ser. No. 215,373
Claims priority, application Germany, Aug. 9, 1961, S 75,237
4 Claims. (Cl. 307—88.5)

The invention disclosed herein is concerned with an impulse-forming network for devices used in the electrical communication art, comprising a transistor operating in common emitter circuit, having an input to which are conducted voltage pulses and an output at which are obtained pulses derived from the flanks of the input pulses.

In devices and installations in the electrical communication art, operating with signal voltages supplied thereto in the form of impulses, there is often posed the problem of deriving short impulses from the impulse flanks. This problem can be solved in diverse manner. Differentiating members are usually employed for the solution of the problem, comprising a series circuit including a capacitor and a resistor; however, there may also be used shunted timing chains or arrangements with attenuated parallel oscillation circuits. All these known arrangements utilize exclusively passive elements and the energy of the derived impulses is very low. The low energy yield makes it necessary to first amplify the newly obtained impulses in an amplifier serially connected with the impulse forming network, before these impulses can be further processed. Moreover, the indicated networks have the peculiarity that the polarity of the derived impulses is always dependent upon the direction of the voltage variation at the input side.

The problem underlying the invention in providing for the initially indicated purpose a particularly simple and amplifying impulse-forming network which, among others, delivers impulses the polarity of which is independent of the direction of the voltage alteration at the input side.

The problem posed by the invention is in connection with a transistor operating in common emitter circuit, to the input of which are conducted voltage impulses and at the output of which are obtained impulses derived from the flanks of the input pulses, according to the invention solved by the provision of a flip resistor disposed in the emitter lead of the transistor, and by dimensioning the internal resistance of the voltage source which is connected in parallel with the control input of the transistor, so small that the network is stable for any value of the input voltage.

The invention is concerned with a transistor amplifier to which is imparted, by the flip resistance the emitter circuit thereof, a trapezoidal working characteristic curve. In the arrangement are combined, as it were, a passive impulse-forming network and a device for amplifying the derived impulses, the effects of the respective individual features being merged to result in a functional unit. The impulses derived from the input voltage, which are preferably obtained at the collector of the transistor, are so far as the polarity thereof is concerned independent of the direction of the voltage variation at the input side. It is accordingly possible to use the invention advantageously as a device for doubling impulses. The flip resistor is advantageously realized by a tunnnel diode.

The invention will now be described more in detail with reference to the accompanying drawing showing an embodiment thereof.

Figures 1, 2, 3, 4:
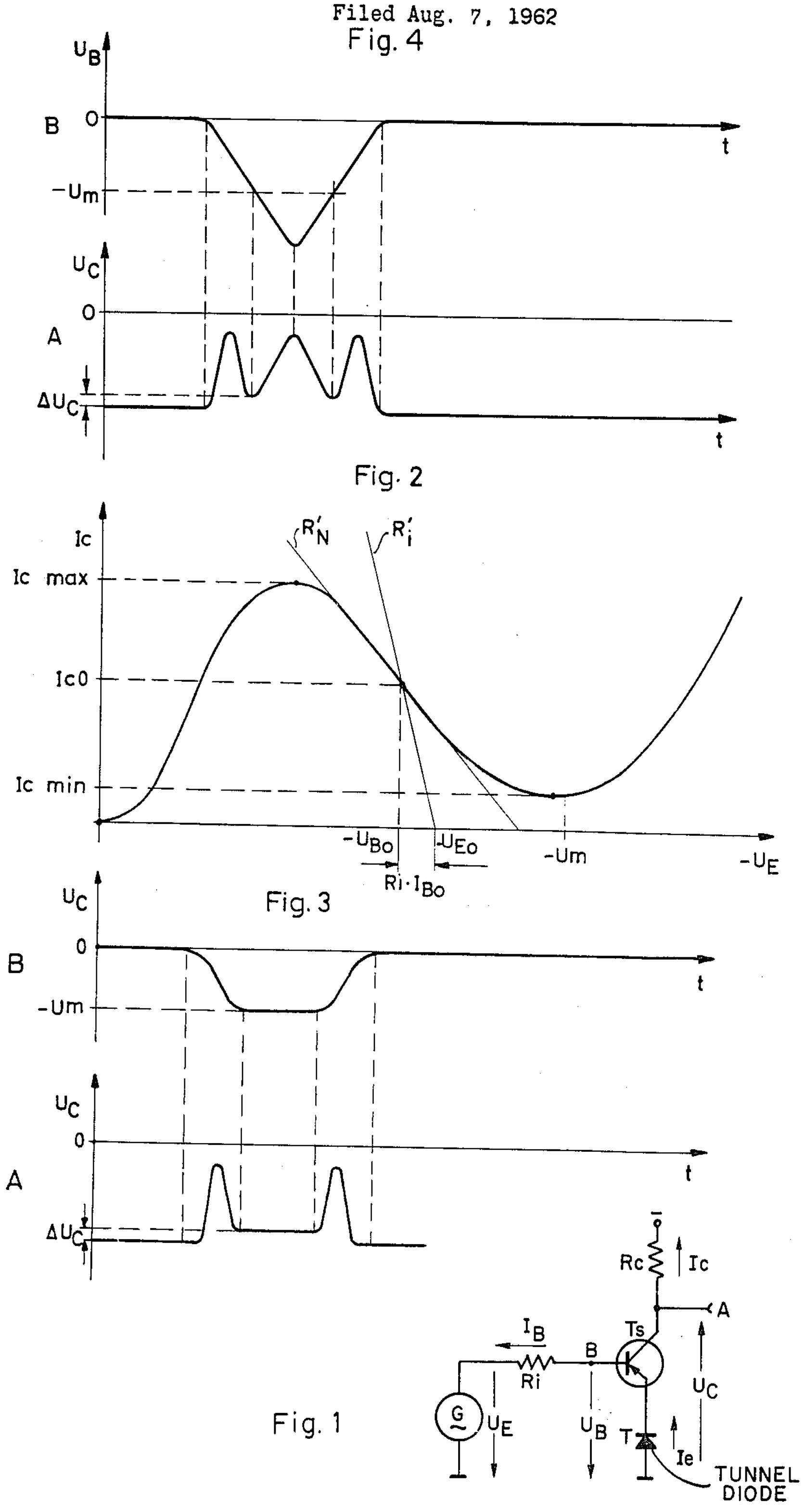
FIG. 1 shows a network according to the invention.
FIG. 2 is a curve showing the collector current $I_c$ plotted with respect to the terminal voltage $-U_E$.
FIG. 3 shows curves of voltages respectively at the terminal B and at the output A of the network according to FIG. 1.
FIG. 4 shows curves of voltages, corresponding to the curves of FIG. 3, where the input receives triangular impulses for use in impulse tripling operations.

The network illustrated in FIG. 1 comprises the transistor $T_s$ which operates in common emitter circuit, the emitter terminal being over the tunnel diode T connected with ground reference potential. The tunnel diode is polarized in the direction of the emitter current $I_c$. The terminal B of the base electrode of the transistor $T_s$ represents the input proper. In parallel with this input is connected the voltage source G with its internal resistance $R_i$, such voltage source being grounded on one side and delivering the voltage impulses. The collector of the transistor $T_s$ receives the negative direct operating voltage at the collector resistor $R_c$. The amplified impulses derived respectively from the terminal voltage $U_E$ of the voltage source G and the base voltage $U_B$, are obtained at the output A (voltage $U_C$).

The internal resistance $R_i$ of the voltage source G must in consideration of the stability of the circuit remain below a given border value. As noted before, the collector current $I_c$ is in FIG. 2 plotted with respect to the terminal voltage $-U_E$. The collector current shows the course which is characteristic for tunnel diodes. The collector current $I_c$ rises initially with increasing terminal voltage $-U_E$, up to a maximum value $I_c$ max., falling thereafter to a minimum value $I_c$ min. The falling branch of the characteristic curve is followed again by a rising branch. On the falling part of the characteristic curve, in the diagram shown in FIG. 2, is indicated a point $I_{c0}/U_{B0}$. Passing through this point are shown the tangential line indicated by $R_N'$ and a straight line $R_i'$ extending steeply with respect to such tangential line. The tangential line $R_n'$ represents the negative resistance $R_N$ of the tunnel diode T, referred to the collector side. Likewise, $R_i'$ represents the internal resistance $R_i$ of the voltage source G, referred to the collector side. The straight line $R_i'$ intersects the abscissa at the voltage $-U_{E0}$. The difference therefore amounts to $$(-U_{E0})-(-U_{B0})=R_i \cdot I_{B0} \qquad \text{(I)}$$

wherein $I_{B0}$ is the base current $I_B$ flowing at the input voltage $U_{E0}$.

The negative resistance $R_N$ of the tunnel diode T, referred to the collector side, as well as the internal resistance $R_i$ of the voltage source, likewise referred to the collector side, are obtained by a simple calculation to amount to $$R_N'=\frac{\beta+1}{\beta}\cdot R_N;\ R_i'=\frac{1}{\beta}\cdot R_i \qquad \text{(II)}$$

wherein $\beta$ is the current amplification factor of the transistor $T_s$, in the circuit according to FIG. 1. It is apparent from FIG. 2 that the stability of the circuit according to the invention is present only so long as the straight line $R_i'$ of the resistance extends steeper than the straight line $R_N'$ of the resistance. With the Equation II there is therefore obtained the stability condition $$(\beta+1)\cdot R_N > R_i \qquad \text{(III)}$$

Only when this expression (III) is fulfilled will the collector current $I_c$ follow each variation of the terminal voltage $U_E$, even in the region of the falling branch of the characteristic curve.

For the practical use of the invention there is to be considered primarily a triggering range of the transistor up to about the voltage value $-U_m$. It is thereby advantageous to dimension the amplitude of the impulse-like terminal voltage $U_E$ so that the voltage $U_B$ at the terminal B is not appreciably below the value $-U_m$ entered in the diagram. The characteristic working curve $T_s$ which is in first approximation trapezoidal is in such case fully triggered through with each impulse supplied at the input side.

For a better understanding of the manner of operation of the circuit according to the invention, in FIG. 3 the input side impulse (diagram B) and the output side impulses (diagram A) are correspondingly plotted with respect to time. To bring the transistor $T_s$ according to FIG. 1 into a conducting state, the input side impulse fed to the transistor base must have a negative polarity. In the lower part of the front flank of such impulse the tunnel diode T is operable in the left rising branch of its current voltage characteristic curve according to FIG. 2. As soon as the current has reached the value $I_c$ max., it again diminishes as a result of the falling characteristic curve branch of the tunnel diode T. At the voltage $-U_m$, at which the front flank of the impulse has risen to its final value, the current, according to the diagram of FIG. 2, has dropped to the value $U_c$ min. The collector voltage of the transistor $T_s$ at the output A, as a result of the phase reversal, runs exactly opposite, as is apparent from the diagram of FIG. 3. In the rear flank of the input impulse the characteristic curve of the tunnel diode is in reverse direction. In the process the collector current $I_c$ rises first again to the value $I_c$ with the voltage diminishing toward the zero potential, subsequently dropping with the input voltage to the zero value. Although, therefore, the input voltage $U_B$ changes in the region of the front flank in the direction of greater negative values and in the region of the rear flank in the direction of positive values, in both cases at output A there appears an impulse which is positive with respect to its reference potential.

The voltage difference $\Delta U_c$ between the two base points of an impulse is due to the slight asymmetry of the working characteristic curve according to FIG. 2. The direction of the base point voltage change from the magnitude $\Delta U_C$ is positive in the case of the impulse derived from the front flank of the input impulse and negative in the case of the impulse derived from the rear flank of the input impulse. The sign of the differential quotient $\Delta U_C/\Delta t$ can be used, therefore, in a simple manner as a criterion for the distinction of the two impulses in each case derived from an input impulse.

The independence of the polarity of the output impulses with respect to the direction of the input side voltage change enables the circuit according to the invention, as previously mentioned, to be suitable as an impulse doubler, and under certain conditions the invention can also be used for impulse tripling.

For this purpose, to the connection B of the transistor according to FIG. 1 there is fed a sequence of triangular impulses, preferably equilaterial triangular impulses.

Such as equilaterial triangular impulse and the three impulses derived from it with the circuit according to the invention are plotted analogously to FIG. 3 in FIG. 4, the diagrams being designated as B and A, one below the other, and correspondingly plotted with respect to time. The operations proceed here in the same manner as in the case of a rectangular impulse, the only difference being that the peak potential of the triangular impulse is now chosen greater than $-U_m$, particularly, so great that the tunnel diode characteristic curve according to FIG. 2 is also effective in the range of its right hand rising branch up to the current value $I_c$ max. The collector current thereby rises three times to the maximal value during one impulse. Correspondingly, at output A there now occurs during the time of the triangular impulse three equally spaced impulses instead of two.

Changes may be made within the scope and spirit of the appended claims which define what is believed to be new and desired to have protected by Letters Patent.

I claim:

1. An impulse forming network, comprising a transistor operating in common emitter circuit, a flip resistance disposed in the emitter lead of said transistor, and having a negative resistance characteristic, a voltage source having an internal resistance which is lower than the negative resistance of the flip resistance supplemented by the product from said negative resistance and the current amplification factor of the transistor, whereby upon application of such voltage, in the form of impulses, whose amplitude is sufficiently great to effect from the front flank thereof, actuation of said flip resistance from its initial condition into a working condition, and from the rear flank thereof, to effect a return of said flip resistance to its initial condition.

2. An impulse-forming network according to claim 1, wherein a tunnel diode constitutes said flip resistance.

3. An impulse-forming network according to claim 2, which is used as a circuit for doubling impulses wherein said voltage source is operative to provide a sequence of rectangular impulses at the transistor input.

4. An impulse-forming network according to claim 1, which is used as a circuit for tripling impulses, wherein said voltage source is operative to provide a sequence of triangular impulses at the transistor input.

References Cited by the Examiner

UNITED STATES PATENTS

| | | | |
|---|---|---|---|
| 3,068,366 | 12/1962 | Brunschweiger | 307—88.5 |
| 3,090,926 | 5/1963 | Engel | 307—88.5 X |

OTHER REFERENCES

Todd: "Tunnel Diode Applications," Application Engineering Notes, Hughes, May 1960, FIG. 13.

ARTHUR GAUSS, *Primary Examiner.*

J. H. HEYMAN, S. D. MILLER, *Assistant Examiners.*